Patented Feb. 4, 1947

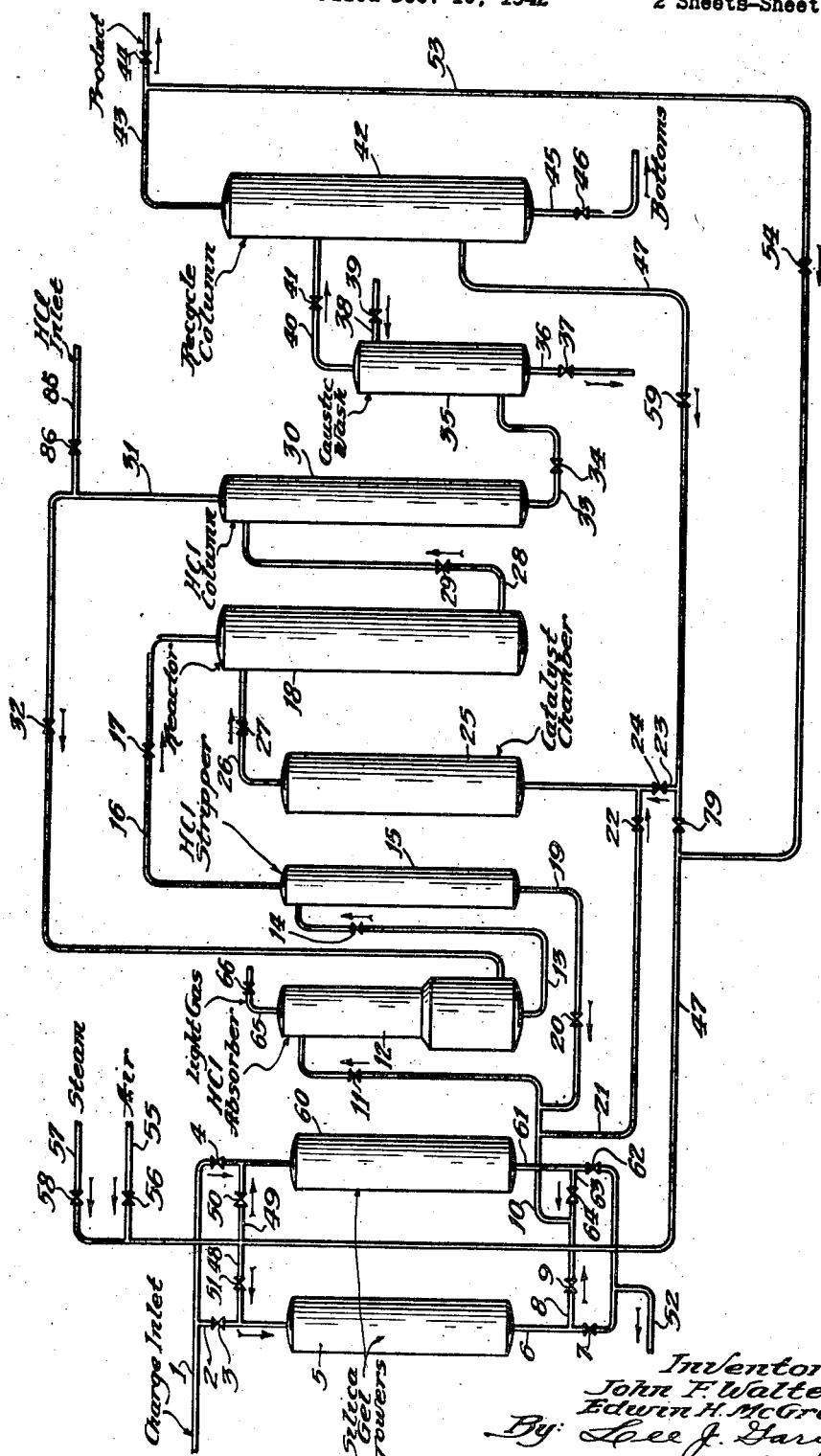

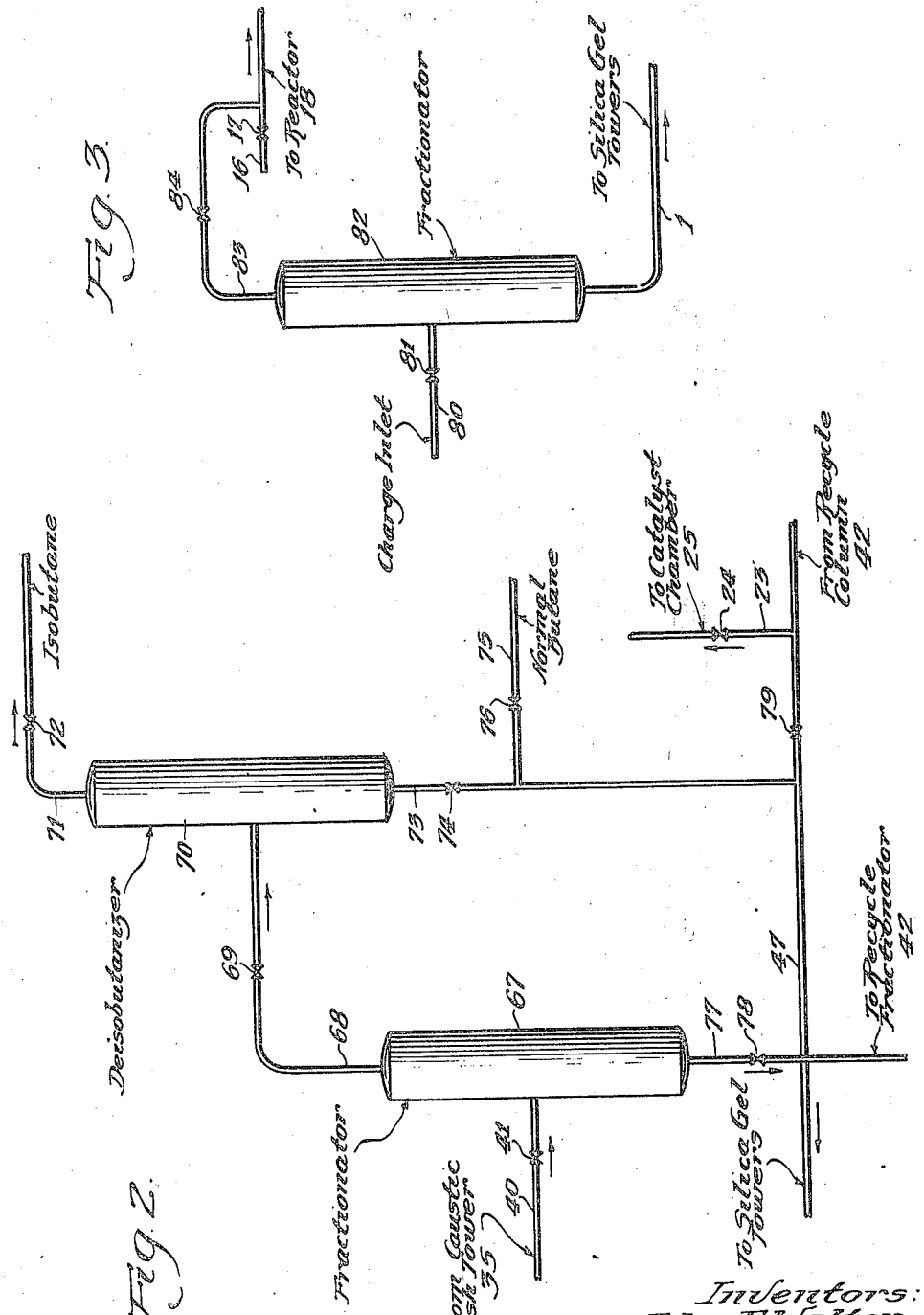

2,415,315

UNITED STATES PATENT OFFICE 2,415,315

ISOMERIZATION OF NORMALLY LIQUID SATURATED HYDROCARBONS

John F. Walter, Chicago, and Edwin H. McGrew, Riverside, Ill., assignors to Universal Oil Products Company, Chicago, Ill., a corporation of Delaware Application December 10, 1942, Serial No. 468,510

8 Claims. (Cl. 260—683.5)

The present invention relates to the isomerization of normally liquid saturated hydrocarbons and is more specifically concerned with a combination operation wherein aromatic hydrocarbons are removed from the charge prior to the isomerization reaction.

It is well known that aromatic hydrocarbons are detrimental to the metallic halide catalysts of the Friedel-Crafts type which are ordinarily used in the isomerization of saturated hydrocarbons. It has been found that the aromatic hydrocarbons react with the catalyst to form hydrocarbon catalyst complexes commonly termed "sludge." The presence of this sludge in the reaction zone introduces many difficulties in the operation. The sludge tends to coat the particles of free metallic halide catalyst and prevent any contact between the hydrocarbon charge and the free catalyst. It has also been found that the metallic halides are soluble in this sludge and are removed from the reaction zone along with the sludge before being effectively used. Although the sludge itself possesses some catalytic activity for the isomerization of saturated hydrocarbons, its effectiveness is considerably less than that of the free metallic halides under similar conditions. It is evident, therefore, that for the more effective utilization of metallic halide catalyst, it is necessary to prevent to a large extent any formation of metallic halide-hydrocarbon complexes within the reaction zone. The formation of these complexes can be substantially eliminated by the removal of the aromatic hydrocarbons prior to the introduction of the charge into the isomerization zone and the increase in efficiency in the operation, measured as gallons of isomerized product produced per pound of metallic halide consumed, is sufficiently pronounced to compensate for the increased cost of operation due to the addition of an aromatic removal system.

Various methods such as solvent extraction, alkylation with olefins, etc., have been proposed to remove the aromatics from the charge prior to isomerization. The method presented herein possesses features which make it vastly superior to any of the previously proposed methods. This improved method comprises contacting the charging stock with a solid adsorbent under conditions such that the aromatics are selectively removed from the charging stock to produce a substantially aromatic-free isomerization charge. Another important advantage obtained is the removal of the aromatics unchanged thereby enabling the recovery of a considerable portion of them in a substantially pure state from the adsorbent during the regeneration cycle. This is particularly true if steam or heated combustion gases are used as one of the regenerating mediums. The recovered aromatics may be used as starting materials in various organic synthesis or may be blended with other hydrocarbon fractions to form a high octane number motor fuel. The recovered aromatics may be blended with the isomerized product to form a hydrocarbon blend having very desirable properties for use as an aviation fuel.

Still another feature of the present invention is the production of a specific hydrocarbon fraction during the isomerization reaction which may be utilized as one of the regenerating mediums in removing the adsorbed hydrocarbon from the solid adsorbent.

The present invention is adaptable to the isomerization of saturated hydrocarbon fractions which contain varying amounts of paraffins, naphthenes and aromatics. Suitable feed stocks include straight run gasoline, natural gasolines, casing head gasolines or similar stocks obtained from other sources. Narrow boiling hydrocarbon fractions such as pentane and hexane fractions containing small amounts of aromatics may also be used.

The solid adsorbents which may be used to remove the aromatics include such materials as silica gel, silica alumina composites, silica alumina thoria composites, peroxide, Activated Alumina, activated charcoal, magnesium silicate and similar materials.

In one specific embodiment, the present invention relates to a process for the production of isomeric saturated hydrocarbons which comprises contacting a mixture of normally liquid saturated hydrocarbons and aromatic hydrocarbons with a solid adsorbent disposed within an adsorption zone under conditions such that the aromatics are selectively removed therefrom, withdrawing the aromatic-free hydrocarbons from said adsorption zone, subjecting said aromatic-free hydrocarbons to contact with a metallic halide catalyst of the Friedel-Crafts type in the presence of a hydrogen halide under conditions of temperature and pressure adequate to convert a substantial portion of the saturated hydrocarbons to isomeric hydrocarbons and separating the isomeric hydrocarbons from the unconverted hydrocarbons.

This invention will be more fully explained in the description of the accompanying diagrammatic drawings wherein Fig. 1 illustrates in conventional side elevation, one type of apparatus in which the objects of the present invention may be accomplished.

Figs. 2 and 3 respectively diagrammatically illustrate modified arrangements of portions of the apparatus of Fig. 1 for accomplishing alternative process steps.

For simplification, such apparatus as condensers, heater, heat exchangers, pumps, etc., which are not essential to the explanation of the drawings, have been eliminated. For further simplification, the described operation will be limited to the utilization of silica gel to remove the aromatics from a commercial hexane fraction. However, by limiting the description to the use of silica gel in a normal hexane isomerization, it is not intended that the invention herein described be unduly limited since the operation is applicable to various other hydrocarbon fractions included within the broad scope of this invention.

Referring to Fig. 1 of the drawings, a normal hexane fraction containing small amounts of aromatics (of the order of 2 to 15% by volume) is introduced through line 1 and line 2 containing valve 3 into silica gel tower 5 wherein the aromatics are selectively removed from the hydrocarbon charge. For continuous operation it is necessary to use two or more silica gel towers so that one may be regenerated while the other is being used to remove the aromatics from the charging stock. For the purpose of explanation, let it be assumed that tower 5 is being used to remove the aromatics in the hydrocarbon charging oil while tower 60 is being regenerated. The method of regenerating is more fully explained hereinafter in this specification. The particular conditions of temperature and pressure maintained in tower 5 will be dependent upon various factors such as the percentage of aromatics in the hydrocarbon charge, type of aromatics, etc. It has been found that the solid adsorbent will effectively remove the aromatics from the hydrocarbons whether they are in vapor, liquid, or mixed phase. Ordinarily the operation is conducted within the temperature range of 0 to 150° C., but, temperatures slightly lower or higher may be used satisfactorily. Although the silica gel adsorbent is in a fixed bed relationship to the incoming hydrocarbon charge in the present illustration, the removal of the aromatics may be accomplished with the adsorbent being introduced as a slurry into the hydrocarbin charge or in as a fluidized mass, the fluidized medium being the aromatic containing hydrocarbons.

The aromatic free hydrocarbons are withdrawn through line 6 into line 8 containing valve 9 and are introduced through line 10 containing valve 11 into the hydrogen chloride adsorber 12 wherein it is contacted with the hydrogen chloride containing stream obtained as hereinafter set forth. The hydrocarbon stream containing hydrogen chloride absorbed therein leaves the absorber through line 13 containing valve 14 and is introduced into hydrogen chloride stripper 15 wherein a major portion of the charge and hydrogen chloride is taken overhead through line 16 containing valve 17 into reactor 18. In order to insure a maintenance of a high hydrogen chloride concentration in the reactor, a portion of the stripped liquid hydrocarbon is recycled from the stripper to the adsorber through line 19 containing valve 20. A portion of the aromatic free hydrocarbon stream leaving the silica gel tower through line 10 by-passes the hydrogen chloride absorber and stripper through line 21 containing valve 22 and is introduced into the catalyst chamber 25 through line 23 wherein the hexane fraction is contacted with the metallic halide catalyst under conditions of temperature and pressure such that a solution of a metallic halide in the hexane fraction is formed containing an adequate amount of metallic halide to catalyze the isomerization of hexane fraction in a subsequent reaction zone. The conditions of temperature and pressure within catalyst tower 25 is dependent somewhat upon the type of catalyst being used and the hydrocarbon fraction charged. The temperature, however, will ordinarily be within the range of 50 to 350° F. and preferably, within the range of 150 to 210° F. The pressure will vary depending upon the temperature used, but will be sufficient to maintain a substantially liquid phase within catalyst tower 25.

The catalyst disposed within tower 25 may comprise aluminum chloride, zinc chloride, and other isomerization catalysts which will dissolve in adequate amounts in the hydrocarbon stream. It is understood that these catalysts are not necessarily equivalent in activity. However, by varying the operating conditions, to compensate for differences in catalytic activity, satisfactory results may be obtained. The catalyst containing hydrocarbon stream leaves catalyst tower 25 through line 26 containing valve 27 and is commingled within reactor 18 with the hydrocarbon stream containing hydrogen chloride introduced through line 16. During the passage of the commingled stream through reactor 18 a substantial portion of the hexane fraction is converted to isomers thereof. The conversion obtained in reactor 18 will be dependent primarily upon the particular conditions of operation such as temperature, pressure, contact time, and hydrogen chloride concentration being used. The temperature in general will vary within the approximate range of 50 to 400° F. under atmospheric or superatmospheric pressure. The hydrogen chloride concentration may be varied from approximately 1 mol percent to 30 mol percent of the hydrocarbon charge. The hydrogen chloride necessary for starting the reaction and any additional amount added during the operation is introduced through line 85 containing valve 86. The reaction may be conducted in a liquid phase mixed phase or vapor phase.

Reactor 18 may comprise a large chamber containing a packing material such as crushed fire brick, synthetic composites, activated compounds, bauxite, acid treated clays and materials having a considerable surface area. On the other hand, reactor 18 may be a large empty chamber providing sufficient time to permit the conversion of a substantial portion of a hexane fraction to isomer thereof. The reaction products leave reactor 18 through line 28 containing valve 29 and are introduced into the hydrogen chloride column 30 wherein the hydrogen chloride and light saturated gases formed during the reaction are separated from the remaining reaction products. The hydrogen chloride and light hydrocarbon gas mixture is withdrawn through line 31 containing valve 32 and introduced into absorber 12 wherein it is contacted with a portion of the incoming charge to remove the hydrogen chloride therefrom. The light hydrocarbon gases are withdrawn from the absorber through line 65 containing valve 66 and are recovered as a product of the reaction. The reaction products substantially free of hydrogen chloride are withdrawn wherein they are isomerized under the conditions previously shown in the explanation of Fig. 1. The separation of the isobutane and normal butane from the reaction products is similar to that shown in Fig. 2. The normally liquid saturated hydrocarbons containing small amounts of aromatic hydrocarbons are withdrawn from fractionator 82 through line 1 and are introduced into the silica gel towers 5 or 60 as previously set forth in the explanation of Fig. 1.

The improved results and the commercial utility of the present invention is evident from the data presented in the following example.

A hexane fraction containing about 2.7% by volume of aromatics was passed through a fixed bed of granular water-free silica gel. The bed of gel was maintained at approximately 90° F. and under atmospheric pressure. About 1.3 volumes of aromatic-free product were obtained per volume of silica gel contacted. A portion of the aromatic-free hydrocarbons leaving the silica gel tower was passed through a bed of granular aluminum chloride at a temperature of 170° F. and under a pressure of 250 pounds per square inch. The effluent from this chamber containing aluminum chloride dissolved therein was commingled within a packed reaction zone with the remaining portion of aromatic-free hydrocarbons containing sufficient hydrogen chloride to give a concentration of approximately 10 mol percent of the entire hydrocarbon mixture. The packed reaction zone was maintained at a temperature of about 225° F. under a pressure of about 300 pounds per square inch. The reaction products leaving said packed chamber were introduced into a fractionator and separated into three fractions, the overhead fraction containing neohextane, 2-3 dimethylbutane and a mixture of 2 and 3 methylbutane, the intermediate fraction contained 2 and 3 methylpentane, normal hexane, and the bottoms fraction containing the higher boiling hydrocarbons formed during the reaction. The overhead fraction amounted to about 53% by volume of the charge, the intermediate fraction 43% and the higher boiling bottoms about 3%. The remaining 1% was loss, which included fixed gases and hydrocarbon-aluminum chloride complexes.

The silica gel containing the aromatic and paraffinic hydrocarbons adsorbed thereon was contacted with steam at 220° F. After approximately 77% of the adsorbed hydrocarbons were removed, the steam was replaced by a heated portion of the isomerized product to remove the remaining aromatic containing hydrocarbons from the silica gel. The first 76% of adsorbed hydrocarbons removed from the silica gel during the steaming operation had an aromatic concentration of approximately 5.7% by volume. The isomerized product blended with the aromatics removed during the regeneration of the silica gel had an octane number of 90 in comparison with the charge octane number of 59.

We claim as our invention:

1. A process for producing a hydrocarbon blend suitable as aviation fuel from a mixture of paraffinic and aromatic hydrocarbons boiling in the gasoline range, which comprises contacting said mixture with a solid adsorbent and preferentially adsorbing aromatic hydrocarbons in the solid adsorbent to separate the same from the paraffins, subjecting the unadsorbed paraffins to isomerization in the presence of a metallic halide catalyst, separating resultant isomerized paraffins from unconverted paraffins, contacting at least a portion of said isomerized paraffins with said solid adsorbent at a temperature sufficient to remove the adsorbed aromatic hydrocarbons from the adsorbent, thereby forming a mixture of aromatic hydrocarbons and isomerized paraffins, and recovering the last-named mixture as said hydrocarbon blend.

2. The process as defined in claim 1 further characterized in that said solid adsorbent comprises silica gel and said catalyst comprises an aluminum halide.

3. The process as defined in claim 1 further characterized in that said catalyst comprises an aluminum halide.

4. The process as defined in claim 1 further characterized in that said catalyst comprises aluminum chloride.

5. A process for the treatment of a hydrocarbon mixture containing normally liquid paraffinic and aromatic hydrocarbons, which comprises contacting said mixture with a solid adsorbent and preferentially adsorbing aromatic hydrocarbons in the solid adsorbent to separate the same from the paraffins, subjecting the unadsorbed paraffins to isomerization in the presence of a metallic halide catalyst, separating from the resultant products an isomerized paraffin fraction and an unconverted paraffin fraction, and contacting at least a portion of one of said fractions with said solid adsorbent at a temperature sufficient to remove the adsorbed aromatic hydrocarbons from the adsorbent.

6. A process for the treatment of a hydrocarbon mixture containing normally liquid paraffinic and aromatic hydrocarbons, which comprises contacting said mixture with a solid adsorbent and preferentially adsorbing aromatic hydrocarbons in the solid adsorbent to separate the same from the paraffins, subjecting the unadsorbed paraffins to isomerization in the presence of a metallic halide catalyst, separating from the resultant products an isomerized paraffin fraction and an unconverted paraffin fraction, and contacting at least a portion of said unconverted paraffin fraction with said solid adsorbent at a temperature sufficient to remove the adsorbed aromatic hydrocarbons from the adsorbent.

7. A process for the treatment of a hydrocarbon mixture containing normally liquid paraffinic and aromatic hydrocarbons, which comprises contacting said mixture with a solid adsorbent and preferentially adsorbing aromatic hydrocarbons in the solid adsorbent to separate the same from the paraffins, subjecting the unadsorbed paraffins to isomerization in the presence of a metallic halide catalyst, separating resultant isomerized paraffins from unconverted paraffins, returning a portion of said unconverted paraffins to the isomerizing step, and contacting another portion of said unconverted paraffins with said solid adsorbent at a temperature sufficient to remove the adsorbed aromatic hydrocarbons from the adsorbent.

8. A process for the treatment of a hydrocarbon mixture containing normally liquid paraffinic and aromatic hydrocarbons, which comprises contacting said mixture with a solid adsorbent and preferentially adsorbing aromatic hydrocarbons in the solid adsorbent to separate the same from the paraffins, subjecting the unadsorbed paraffins to isomerization in the presence of a metallic halide catalyst, separating resultant isomerized paraffins from unconverted paraffins, passing a portion of said unconverted paraffins in liquid form through a body of metallic halide catalyst under conditions to dissolve metallic halide in the liquid, from column 30 through line 33 containing valve 34 and are introduced into caustic wash chamber 35 wherein the remaining hydrogen chloride and aluminum chloride are neutralized by contact with caustic solution. The fresh caustic solution is introduced through line 38 containing valve 39 and the spent solution withdrawn through line 36 containing valve 37.

The hydrocarbon stream leaves chamber 35 through line 40 containing valve 41 and is introduced to fractionator 42 wherein the desired isomers are separated from the unconverted and heavy hydrocarbons formed during the reaction. The isomers are withdrawn through line 43 containing valve 44 and may be recovered as a product of the reaction or may be further fractionated either continuously or in batch operation to separate the specific isomers. The heavy hydrocarbons formed during the reaction are withdrawn through line 45 containing valve 46 and are recovered as a product of the reaction. The recycled hydrocarbons are withdrawn through line 47 containing valve 59 and a portion is directed through line 23 containing valve 24 into catalyst tower 25. The remaining portion is used in the regeneration of the silica gel disposed within tower 60.

The regeneration may be conducted in various ways. Steam may be introduced through line 57 containing valve 58 to line 49 containing valve 50 into chamber 60. The hydrocarbons removed from the adsorbent are withdrawn through line 61 containing valve 62 into line 52 and may be sent to a subsequent separation system, not illustrated, wherein the hydrocarbons are separated from the steam condensate. After the steaming has completely removed the hydrocarbons, hot gases such as flue gases, combustion gases or air may be introduced into the system through line 55 containing valve 56 and passed through the adsorbent to remove the last trace of the moisture prior to the utilization of the adsorbent for aromatic removal from the hydrocarbon charge. The initial hydrocarbons removed from the silica gel during the steaming operation are low in aromatic hydrocarbons and as the steaming continues, the concentration of aromatics of the hydrocarbons being removed increases until a substantially pure aromatic fraction is obtained. By separating the various fractions as they are removed it is possible to recover a great portion of the aromatics in a substantially pure state.

Another method of regenerating the catalyst consists of a preliminary steaming whereby the hydrocarbon fractions low in aromatics are removed followed by the introduction of heated recycled hydrocarbons from line 47 containing valves 59 and 79 into line 49 containing valve 50 through the bed of solid adsorbent in tower 60 to remove the highly concentrated aromatic fractions and any moisture which will remain from the steaming operation. The temperature of the regeneration is considerably higher than the previous adsorption recycle so that the amount of hydrocarbons maintained on the adsorbent is decreased. The temperature of the regeneration will ordinarily be within the range of approximately 200 to 400° F. or slightly higher. The recycled hydrocarbons retained on the silica gel will be displaced during the subsequent adsorption cycle and will be charged to the isomerization reaction.

Still another method of regeneration consists of introducing a heated portion of the isomerized product from line 53 containing valve 54 into line 47 ahead of valve 79 and through line 49 containing valve 50 into tower 60 following a preliminary steaming treatment as explained above. The isomerized product leaving silica gel tower 60 will contain the aromatic hydrocarbons having a high anti-knock value and will form a blend which will be suitable as an aviation fuel. By maintaining the temperature of the regeneration high, the amount of isomerized product retained by the silica gel which will be subsequently introduced into the isomerization zone will be too small to materially effect the isomerization operation.

Still another method of regeneration which is particularly applicable when the charge consists of a mixture of hydrocarbons containing butanes is shown in Fig. 2. To avoid duplication, Fig. 2 is limited to that portion of the apparatus which is essentially different from that shown in Fig. 1. It is to be understood, that the equipment shown in Fig. 2 is to be used in conjunction with that shown in Fig. 1 and that the operating conditions previously given are also applicable to the operation as shown in Fig. 2. Referring to Fig. 2, the reaction products leaving the caustic wash tower 35 are introduced through line 40 containing valve 41 into fractionator 67 wherein a butane fraction is separated from the higher boiling hydrocarbons. These higher boiling hydrocarbons leave fractionator 67 through line 77 containing valve 78 and are separated into isomeric hydrocarbons and unconverted hydrocarbons in subsequent fractionators not shown in the drawings. The unconverted hydrocarbons may be recycled to the isomerization zone. The butane fraction withdrawn through line 68 containing valve 69 is introduced into deisobutanizer 70 wherein the isobutane is separated from the normal butane. The isobutane is withdrawn through line 71 containing valve 72 and is recovered as a product of the reaction. The unconverted normal butane is withdrawn through line 73 containing valve 74 and sent through line 47 into the silica gel towers as a regenerating medium. The recycled butane is heated to a temperature in the approximate range of 200 to 500° F. and passed through the bed of silica gel having the aromatic and paraffinic hydrocarbons adsorbed thereon. The butane and desorbed hydrocarbons leaving the silica gel towers are sent to a fractionator and the butane separated from the higher boiling hydrocarbons and recycled as a regenerating medium. Extraneous heated butane may be introduced through line 75 containing valve 76 and introduced as a regenerating medium through line 47.

An alternative method for handling hydrocarbon mixtures containing butane is shown in Fig. 3. This consists primarily of prefractionation of the hydrocarbon mixture containing butanes to remove the butanes prior to the aromatic removal step. In operating in this manner, the volume of hydrocarbons passing through the silica gel towers may be reduced considerably. Referring to Fig. 3, the charge, a hydrocarbon mixture containing butanes, normally liquid saturated hydrocarbons and small amounts of aromatics, is introduced through line 80 containing valve 81 into fractionator 82 wherein the butanes are separated from the remaining hydrocarbons. The separated butanes are withdrawn from fractionator 82 through line 83 containing valve 84 and are introduced into line 16 ahead of valve 17. The butanes are passed through reactor 18 supplying the resultant solution to the isomerizing step, and contacting another portion of said unconverted paraffins with said solid adsorbent at a temperature sufficient to remove the adsorbed aromatic hydrocarbons from the adsorbent.

JOHN F. WALTER.
EDWIN H. McGREW.

REFERENCES CITED

The following references are of record in the file of this patent:

UNITED STATES PATENTS

| Number | Name | Date |
|---|---|---|
| 2,260,179 | D'Ouville et al. | Oct. 21, 1941 |
| 1,453,215 | Voress et al. | Apr. 24, 1923 |
| 2,169,494 | Ipatieff et al. | Aug. 15, 1939 |
| 2,300,235 | Pines et al. | Oct. 27, 1942 |
| 1,412,954 | Mittasch et al. | Apr. 18, 1922 |
| 2,281,924 | deSimo et al. | May 5, 1942 |
| 2,324,295 | Goldsby et al. | July 13, 1943 |
| 2,344,449 | Ogorzaly | Mar. 14, 1944 |
| 1,678,298 | Patrick et al. | July 24, 1928 |
| 2,375,321 | Nysewander et al. | May 8, 1945 |

FOREIGN PATENTS

| Number | Country | Date |
|---|---|---|
| 456,320 | British | Nov. 6, 1936 |
| 190,203 | British | Dec. 18, 1922 |

OTHER REFERENCES

Mair et al., "Separation of Petroleum Hydrocarbons Effected Through Use of Silica Gel," Oil & Gas. Jour., Sept. 19, 1935, page 29. (Copy in Library.)

Gurwitsch et al., "Scientific Principles of Petroleum Technology," Chapman and Hall, Ltd., (1932) London, pages 485, 486, and 489. (Copy in Division 31.)